United States Patent [19]

Hennessy et al.

[11] 4,437,130

[45] Mar. 13, 1984

[54] CASSETTE ADAPTER FOR EIGHT TRACK MACHINES

[76] Inventors: John B. Hennessy, 1232 Albert Dr., Santa Rosa, Calif. 95405; Derek Lane, 738 Dexter St., Santa Rosa, Calif. 95404

[21] Appl. No.: 332,082

[22] Filed: Dec. 18, 1981

[51] Int. Cl.³ .............................................. G11B 5/008
[52] U.S. Cl. ........................................ 360/94; 360/90
[58] Field of Search ................................... 360/90–94; 242/188–200; 445/89, 344, 345, 346; 369/6–12; D14/2–9

[56] References Cited

U.S. PATENT DOCUMENTS

| | | | |
|---|---|---|---|
| 3,350,025 | 10/1967 | Kar | 360/132 |
| 3,431,367 | 3/1969 | Nickl | 360/92 |
| 3,644,684 | 2/1972 | Tsuji | 360/94 |
| 3,756,487 | 9/1973 | Pechi | 360/92 X |
| 3,812,537 | 5/1974 | Grae et al. | 360/92 X |
| 4,031,555 | 6/1977 | Hughes et al. | 360/94 |

Primary Examiner—Aristotelis M. Psitos
Assistant Examiner—K. Wong
Attorney, Agent, or Firm—Melvin R. Stidham

[57] ABSTRACT

An adapter for an eight track cartridge playing machine having a transfer roller to engage the conventional capstan and suitable motion transmitting means to drive an upright capstan in a cassette housing. Playback heads are carried on a carrier which may be raised or lowered to the desired level in accordance with which of a vertical bank of cartridge receivers is to be activated. Two cartridges are carried in each receiver and the receivers are independently pivotable so that a control knob may be turned to pivot the receiver and bring the selected cartridge into engagement with the drive capstan, and into operative association with the selected playback head.

6 Claims, 7 Drawing Figures 4,437,130

CASSETTE ADAPTER FOR EIGHT TRACK MACHINES

BACKGROUND OF THE INVENTION

Currently, a popular recording medium is the eight track cartridge wherein an entire medley of songs or tunes are played in a prescribed order for an extended period of entertainment for the home or automobile. However, a particular eight track cartridge is ordinarily composed of renditions of a single artist or musical group, and one may often have to listen to a number of lesser renditions in order to hear a particular number that he or she particularly favors. Often, there are no more then one or two renditions on a single tape which are of particular interest and it is necessary to suffer through unwanted music to hear what one wants to hear. Smaller cassettes having a single musical number recorded thereon are also available but this usually requires frequent replacement of cassettes in order to enjoy a continuous period of musical enjoyment.

OBJECTS OF THE INVENTION

It is an object of this invention to provide an adapter for an eight track playback machine which will enable the selection of any one of a number of individual renditions.

It is a further object of this invention to provide an adapter for an eight track playback machine which enables greater flexibility of programs selection.

Other objects and advantages of this invention will become apparent from the description to follow, particulary when read in conjunction with the accompanying drawings.

SUMMARY OF THE INVENTION

In carrying out this invention, I provide an eight track adapter having a flat extension which is adapted to be received into a conventional eight track playback machine and which has a transfer roller to engage the conventional capstan of the playback machine. An integral cassette housing contains a vertical array of cassette receivers, each to receive a pair of cassettes disposed at an angle. Each receiver is pivotally mounted so that a receiver at a selected level can be pivoted to bring one of its two cassettes into engagement with the capstan which is driven by motion transmission chain for the transfer roller and into operative association a playback head. Two playback heads are provided on a carrier, one for each of two cassettes, and the carrier may be raised or lowered selectively in opposition to a selected one of the bank of cassettes.

DESCRIPTION OF A PREFERRED EMBODIMENT

Figure 1:
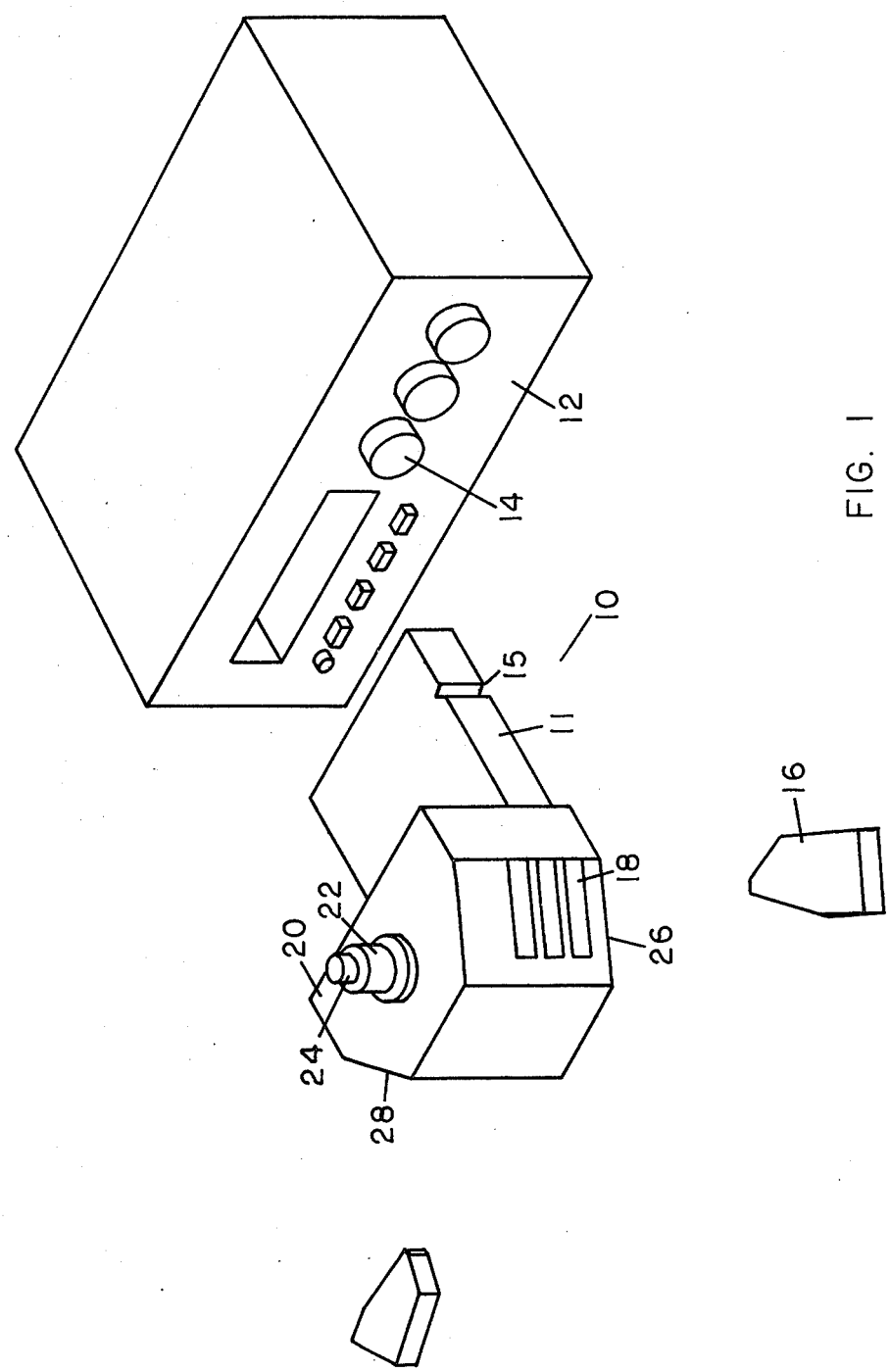
FIG. 1 is a view in perspective showing an eight track machine with the adapter and cassette cartridges of this invention.

Referring now to FIG. 1 with greater particularity, the eight track adapter 10 of this invention includes a body with a flat transfer housing 11 which may be received in a conventional eight track playback machine 12 with suitable control knobs 14 for control of volume, base, treble and the like. A plurality of miniature cartridges 16 are adapted to be inserted into slots 18 in the cassette housing 20 of the adapter 10. Suitable control knobs 22 and 24 are provided for selection of specific cassette 16, as will hereinafter be described. The cassette housing includes vertical banks of receivers 18 on angled sides thereof 26 and 28, and the control knobs 22 and 24 provide means for positioning playback heads at a selected level and for engaging cassettes from a selected side 26 or 28 of the cassette housing, all as will hereinafter be described.

Figure 2:
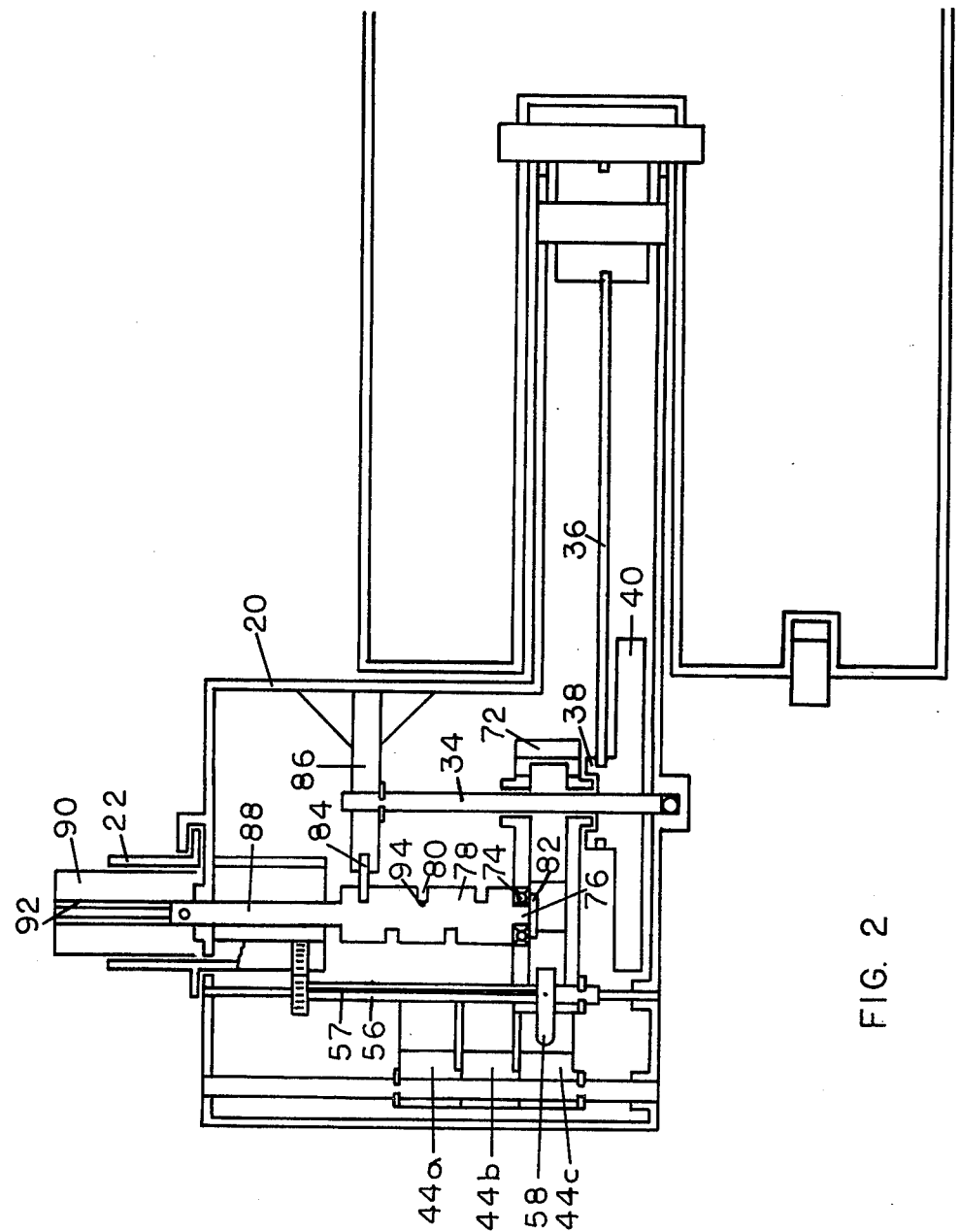
FIG. 2 is a vertical section of the adapter in place for operation.
Figure 3:
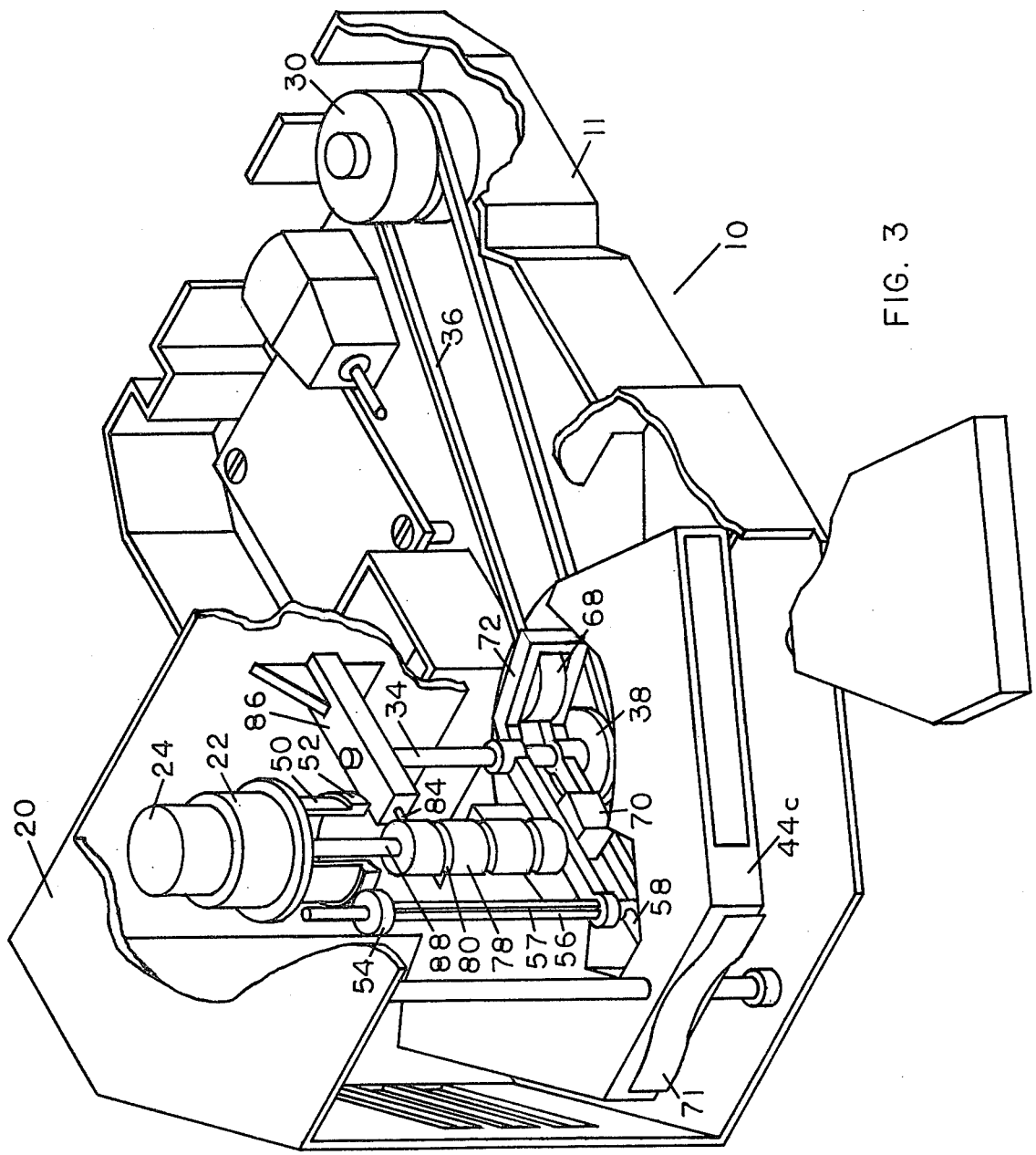
FIG. 3 is a view in perspective of the adapter partially broken away to show the internal components.
Figure 4:
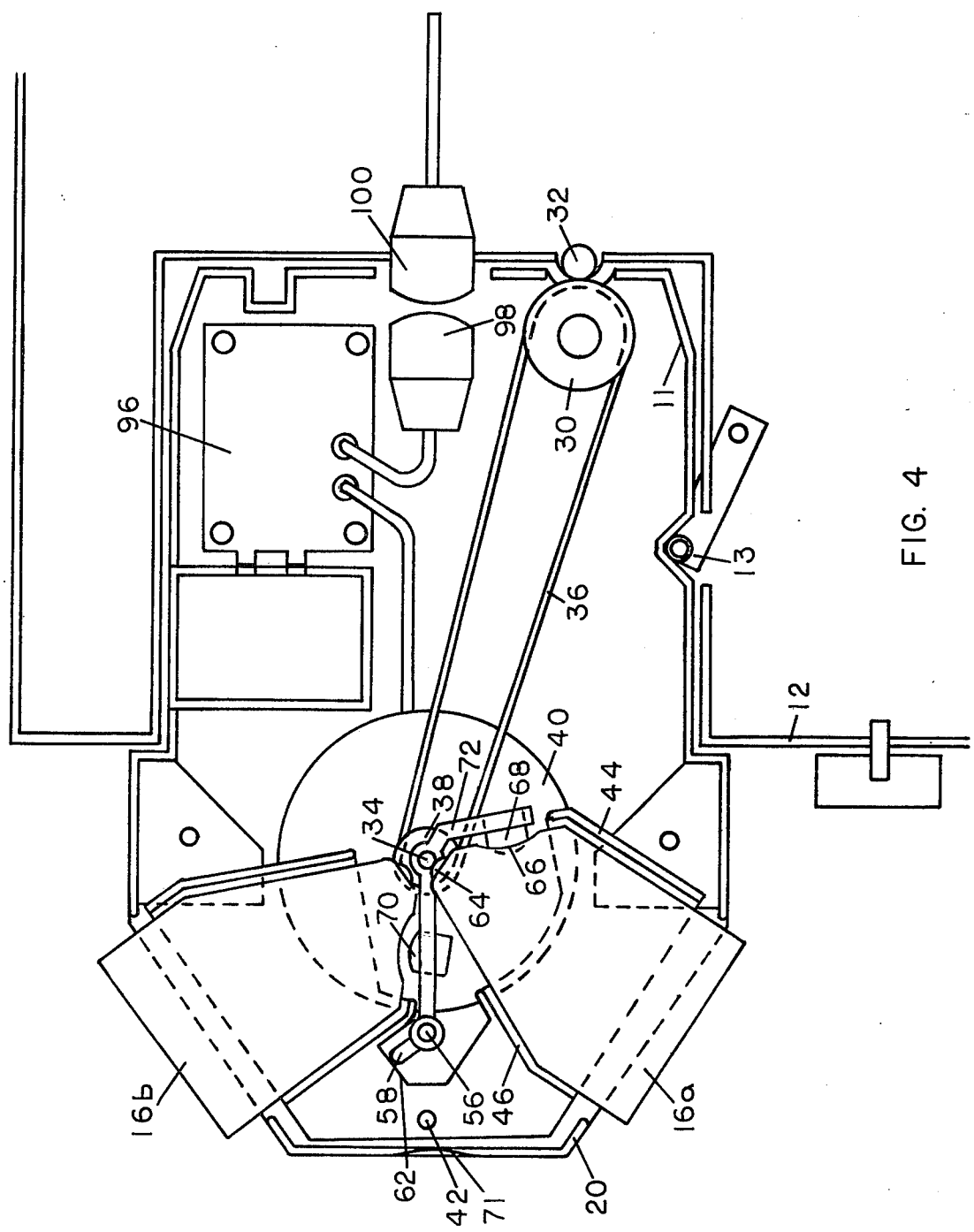
FIG. 4 is a horizontal section view of the adapter.

Referring now to FIGS. 2, 3 and 4, a transfer roller 30 is rotatably carried in the transfer housing portion of the adapter 10 to engage the conventional capstan 32 of the playback machine 12 (FIG. 4). A spring mounted retainer 13 is received in a recess 15 to hold the housing 11 in place. Through any suitable motion transmitting means, the transfer wheel 30 drives an upright capstan 34 which is rotatably carried in the cassette housing 20. In the drawings, the motion transmitting device is pictured as a belt 36 driving a pully 38 to rotate the capstan 34. A fly wheel 40 may be provided to smooth the rotation of the capstan 34. The capstan 34 functions as the driving means for the miniature cartridges, as will be described.

Independently pivoted on a vertical rod 42 in the cassette housing are 3 cassette receivers 44, each having a pair of receptacles 46 and 48 to receive a pair of miniature cassettes 16. The outer control knob 22 carried on the cassette housing 12 as a depending skirt 50 (FIG. 3) on which is carried a gear segment 52 meshing with a pinion 54 carried on an adjacent shaft 56. Also splined at 57 on the shaft 56 and slidable therealong is a pivoted cam finger 58 which when pivoted engages cam surfaces 60 or 62 to pivot the cartridge carrier 44 with which it is aligned, to cause a selected cartridge 16 to engage the capstan 34. As shown in FIG. 4, the arm 58 has been pivoted to engage the surface 62 to pivot the cartridge receiver 44 counterclockwise to bring the drive roller 64 of cartridge 16a into engagement with the drive capstan 34 and to bring a tape playback opening 66 into operative association with one of two playback heads 68 and 70 which are mounted on a carrier 72. The cartridge receivers are normally in a neutral position with the drive rollers of both cassettes 16a and 16b inoperative, being biased in that position by suitable spring means 71.

Referring now to FIG. 2, the playback head carrier 72 has rotary bearings 74 to rotatably receive the shaft 76 of a drum 78 having a helical cam track 80 formed around the circumference thereof. A suitable lock ring 82 secures the playback head carrier 72 from moving axially with respect to the drum 78.

Engaged in the helical track 80 of the drum is a cam follower 84 carried on a stationary member 86, which is secured to the cassette housing 20. Hence, when the cam shaft 88 of the drum 78 is rotated by the control knob 24, the drum 78 simply rides up the cam follower 84 to raise the camshaft 88 up through a axial passageway 92 in the control knob, raising with it, the playback head carrier 72, as well as the pivotal cam finger 58, previously described. The extremities of the cam track 80 position the play back heads 68 and 70 into alignment with the top and bottom 44a and 44c cassette receivers, respectively, and the follower 84 is spring mounted to engage a detent 94 in the cam track to position the carrier heads opposite the intermediate of the three cassette receivers 44b.

In operation, the inner control knob 24 is turned to rotate the drum 78 causing the drum to ride up the cam follower to bring the playback head carriers to the desired level to play either the top, bottom or intermediate cassettes, and then the outer knob 22 is turned to either left or right from its normal neutral position determined by the spring 71 to bring the selected one of the two cassettes at that level into operative engagement with the drive capstan and its selected playback head.

With the association so established, the signal picked up by the playback head is transmitted to a suitable receiver transmitting circuitry at 96 and then to a transfer head 98 wherein the playback is transmitted to a receiving head 100 forming a part of the eight track playback machine.

Figure 6:
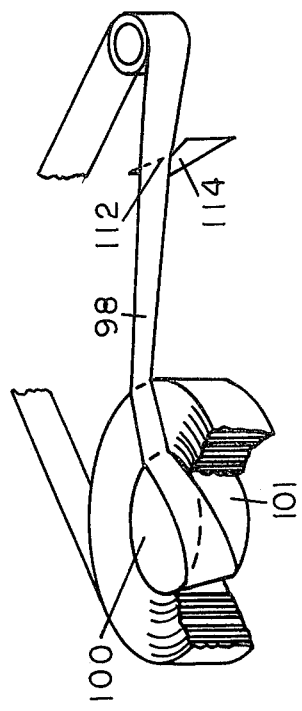
FIGS. 6 and 7 are somewhat schematic views, in perspective showing the cartridge tape travel.
Figure 7:
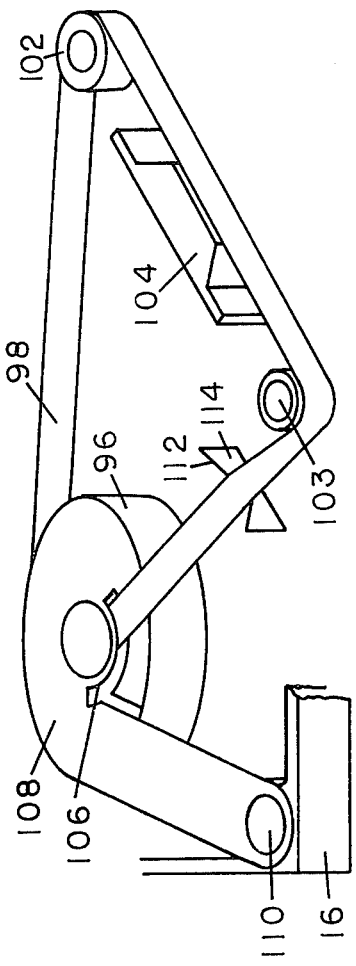
Figure 5:
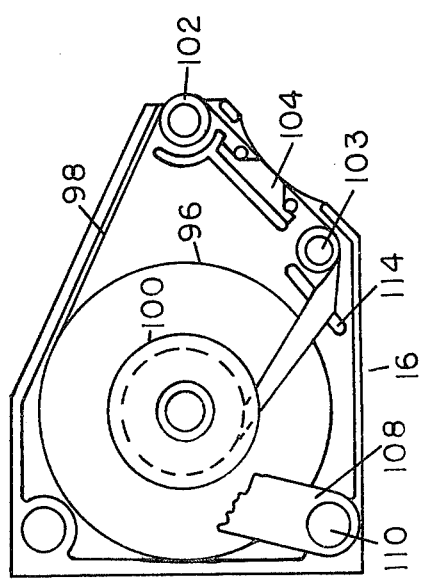
FIG. 5 is plan view, with cover removed, of a tape cartridge forming a feature of this invention.

Referring now specifically to FIGS. 5, 6 and 7, there is shown a miniature cassette 16 carrying a roll 96 of magnetic tape 98 which is wound around a core roll 100 with an outer surface 101 of inverted frusto-conical configuration. As shown, the tape 98 is fed from the inside of the roll or coil 96 and is returned to the outside of the coil 96. A drive roll 102, which is driven by the drive capstan 34, as previously described, pulls the tape from a guide roll 103 past the pressure plate 104 opposing the recording head 68 or 70 (FIG. 3).

From the inverted frusto-conical surface 101 of the core roll 100 the tape is drawn through an arcuate slot 106 in a guide plate 108, which is anchored to the frame at 110. The tapered surface 101 of the core roll 100 twists the tape 98 from the vertical disposition to start it up over the top of the tape roll 96, to pass through the arcuate guide 106 in a horizontal disposition toward an angled surface 112 on a stationary guide 114 in the cassette 16. Hence, the tape 98 is raised up above the top surface of the roll 96 and then is guided by the surface 112 and the guide roller 103 back to the vertical position to move past the guide plate 104.

While this invention has been described in conjunction with the preferred embodiment thereof, it is obvious that modifications and changes therein may be made by those skilled in the art without departing from the spirit and scope of this invention, as defined by the claims appended hereto.

What is claimed as invention is:

1. An adapter for an eight track stereo system comprising:
    a body, including a flat transfer housing to be received in an eight track tape player, and a cassette housing;
    at least two vertically aligned cassette receivers pivotally mounted in said cassette housing;
    a transfer wheel in said transfer housing adapted to engage the conventional drive capstan of an eight track system;
    an upright capstan in said cassette housing;
    rotary motion transmitting means connecting said transfer wheel and said upright capstan;
    a pick-up head carrier with at least one pick-up head thereon mounted for vertical movement in said cassette housing;
    means for moving said carrier into alignment with a selected one of said cassette receivers; and
    means for pivoting a selected one of said cassette receivers into operative association with said upright capstan and said pick-up head.
2. The adapter defined by claim 1 wherein:
    each of said cassette receivers has a pair of slots to receive cassettes disposed at an angle to each other;
    there is a pair of pick-up heads on said carrier; and
    said pivotal means is operative to pivot a selected one of said cassette receivers to bring a selected one of two cassettes contained therein into operative association with said pick-up head and said upright capstan.
3. The adapter defined by claim 2 including:
    yieldable means biasing said cassette receivers into a normal, neutral position out of operative associate with said upright capstan and either pick-up head.
4. The adapter defined by claim 1 including:
    an upright cam drum with a helical cam track rotatably mounted in said carrier but fixed therein against axial movement;
    a stationary member engaging of said cam track so that rotation thereof will move said carrier vertically; and
    manually operated means for rotating said cam drum.
5. The adapter defined by claim 4 wherein:
    there are three vertically aligned cassette receivers pivotally mounted in said cassette housing; and including:
    detent means on said stationary member and said upright cam drum to fix said carrier in alignment with the middle one of said cassette receivers.
6. The adapter defined by claim 1 including:
    an arm pivotally mounted on said carrier and engagable with a cassette receiver aligned therewith to pivoting same into said operative association; and
    manually operable means for pivoting said arm.

* * * * *